United States Patent [19]

Goulet

[11] Patent Number: 4,890,593
[45] Date of Patent: Jan. 2, 1990

[54] FUEL INJECTION CONTROL SYSTEM FOR AN INTERNAL COMBUSTION ENGINE

[75] Inventor: Carl R. Goulet, Daphne, Ala.

[73] Assignee: Teledyne Industries, Inc., Los Angeles, Calif.

[21] Appl. No.: 169,637

[22] Filed: Mar. 17, 1988

[51] Int. Cl.⁴ .......................... F02M 51/00; F02B 3/00
[52] U.S. Cl. ...................................... 123/489; 123/440
[58] Field of Search ............... 123/489, 440, 478, 438, 123/432

[56] References Cited

U.S. PATENT DOCUMENTS

| | | | |
|---|---|---|---|
| 4,245,603 | 1/1981 | Pomerantz | 123/440 |
| 4,295,451 | 10/1981 | Long | 123/438 |
| 4,305,364 | 12/1981 | Stuckas | 123/440 |
| 4,428,345 | 1/1984 | Bertach et al. | 123/440 |
| 4,442,817 | 4/1984 | Auth et al. | 123/489 |
| 4,498,440 | 2/1985 | Nomura et al. | 123/438 |
| 4,509,483 | 4/1985 | Johnson | 123/432 |
| 4,526,001 | 7/1985 | Burns et al. | 60/274 |
| 4,628,881 | 12/1986 | Beck et al. | 123/447 |
| 4,683,854 | 8/1987 | Goulet | 123/478 |
| 4,729,359 | 12/1987 | Tomisawa | 123/489 |
| 4,751,909 | 6/1988 | Otobe | 123/489 |

Primary Examiner—Raymond A. Nelli
Attorney, Agent, or Firm—Gifford, Groh, Sheridan, Sprinkle and Dolgorukov

[57] ABSTRACT

A fuel injection system for an internal combustion engine utilizing output signals from existing "dual magneto" ignition system to produce output pulses in synchronism with the revolution of the output shaft. A pressure transducer measures the pressure in the intake manifold while a control system generates a VALVE OPEN signal in synchronism with the magneto signal and having a duration proportional to the pressure in the intake manifold to open the fuel injectors and provide fuel to the engine. A special engine starting fuel schedule, hot enrichment schedule, cold enrichment schedule and auto-lean fuel schedule are also generated by the control system.

9 Claims, 3 Drawing Sheets

FUEL INJECTION CONTROL SYSTEM FOR AN INTERNAL COMBUSTION ENGINE

BACKGROUND OF THE INVENTION

I. Field of the Invention

The present invention relates to a fuel control system for a fuel injection engine.

II. Description of the Prior Art

In an electronic fuel injection system for an internal combustion engine, at least one fuel injector is associated with each engine cylinder. Each fuel injector, furthrmore, includes a valve which, when opened, supplies fuel to the engine cylinder.

There have been a number of previously known fuel injection systems which open the fuel injector valves in synchronism with the rotation of the engine output shafts. Many of these previously known fuel injections systems, furthermore, utilize a timing signal from a proximity pickup or other switching device mechanically associated with the engine output shaft to control the initial opening of the fuel injector valve with respect to the rotational position of the shaft.

SUMMARY OF THE PRESENT INVENTION

The present invention provides a fuel injection system which overcomes all of the above mentioned disadvantages of the previously known systems.

In brief, the fuel injection system of the present invention is used in conjunction with an internal combustion engine of the type having an intake manifold, a plurality of engine cylinders and a rotary output shaft. The magnetos are mechanically coupled to the rotary output shaft and produce output pulses in synchronism with the revolution of the output shaft. In the conventional fashion, the magneto produces its output pulses only at predetermined angular rotational positions of the output shaft with respect to the engine.

At least one fuel injector is provided for each engine cylinder for providing fuel to that engine cylinder. A fuel valve is associated with each injector which, when opened, supplies fuel to the cylinder through the fuel injector. Consequently, the duration that the valve is open determines the amount of fuel provided through that injector and to the engine during that engine revolution.

Fuel Pressure to the nozzle is automatically controlled to ensure a constant P across the nozzle.

A pressure transducer in the intake manifold to the engine generates a pressure output signal representative of the manifold pressure. The output pulses from the magneto as well as the pressure output signal from the manifold pressure transducer are connected as input signals to a fuel control system which, in accordance with a predefined fuel schedule, generates VALVE OPEN signals to the fuel injectors. The VALVE OPEN signal is generated in synchronism with the pulse from the magneto and has a duration proportional to the pressure output signal.

During an engine starting condition, as opposed to an engine operating condition, the control unit generates a plurality of VALVE OPEN signals during each engine cycle. In addition, a temperature transducer measures the cylinder head temperature for the engine and generates a temperature signal proportional to this cylinder head temperature. The control system utilizes the temperature signal to vary the duration of the VALVE OPEN signal during an engine starting condition to provide efficient hot starts and cold starts.

The temperature signal is also used to modify the VALVE OPEN signal to provide fuel enrichment to the engine during both hot and cold engine operating conditions.

An auto-lean fuel schedule is also included for use during engine cruising conditions. During the auto-lean cycle, the duration of the VALVE OPEN signal is periodically reduced by a preset amount every ten or twenty minutes when the exhaust temperature is checked for, an increase, repeated several times in one second intervals until the exhaust gas temperature decreases. When this happens, the duration of the VALVE OPEN signal is adjusted by a second predetermined amount for maximum engine efficiency. This entire cycle is periodically repeated.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
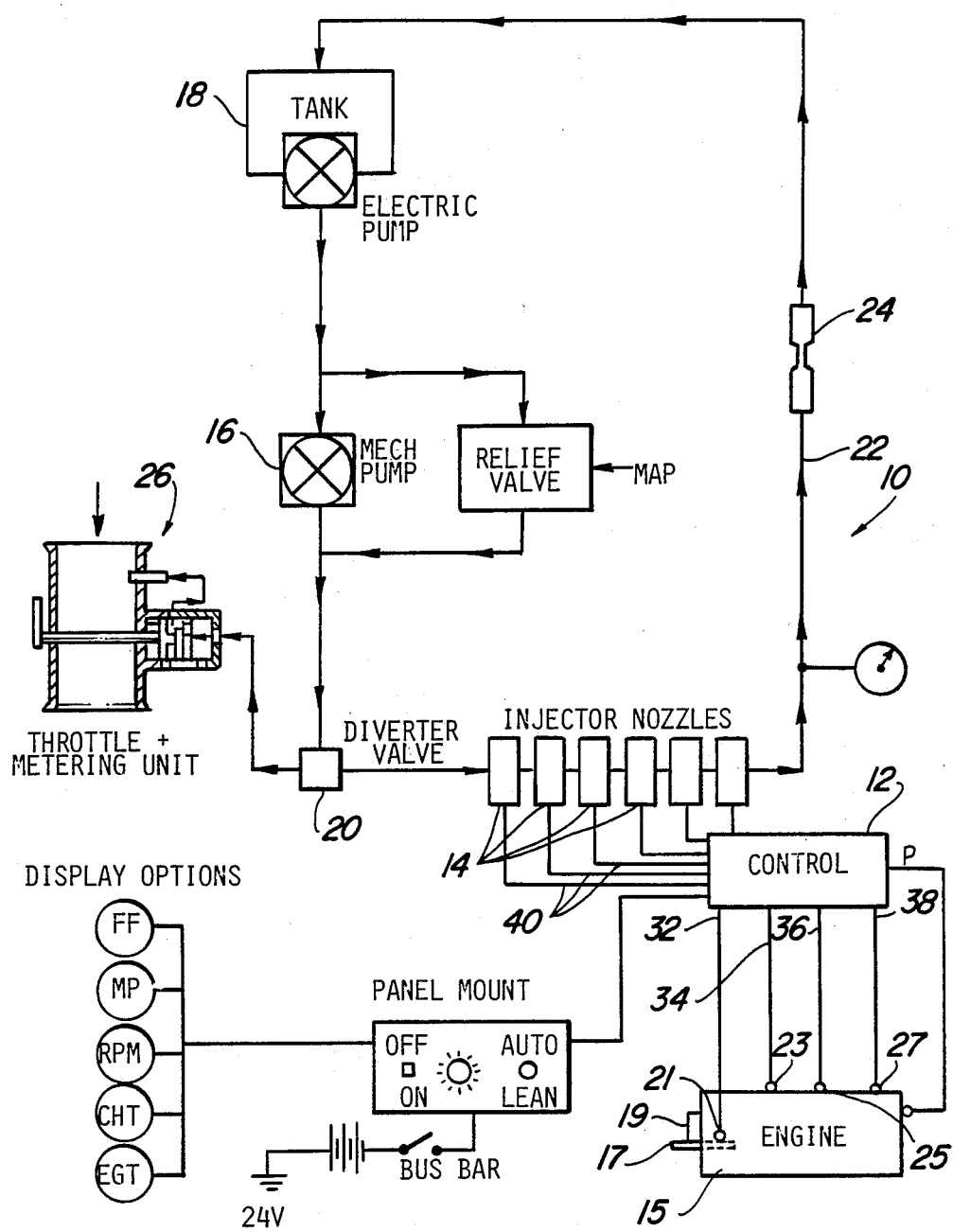
FIG. 1 is a diagrammatic view illustrating a preferred embodiment of the present invention.

With reference first to FIG. 1, a preferred embodiment of the fuel injection system 10 of the present invention is there shown and comprises an electronic fuel control unit 12 which will subsequently be described in greater detail. The control unit 12 controls the operation of six fuel injectors 14 wherein each fuel injector 14 is associated with one cylinder of an internal combustion engine 15.

Still referring to FIG. 1, a pump 16 supplies fuel from a tank 18 through a diverter valve 20 and to the fuel injectors 14. Excess fuel from the injectors 14 is returned through a return line 22 through a restrictor 24 to the tank 18. In addition, a mechanical back up carburation system 26 is also provided to enable continued operation of the internal combustion engine 15 in the event of an electrical power failure.

The overall fuel supply system for the fuel injectors 14, as well as the operation of the backup carburetion system 26 is disclosed more fully in U.S. Pat. No. 4,683,854 entitled "Electronic and Mechanical Fuel Supply System" and which is commonly owned with this application. The disclosure of U.S. Pat. No. 4,683,854 is incorporated herein by reference.

Figure 2:
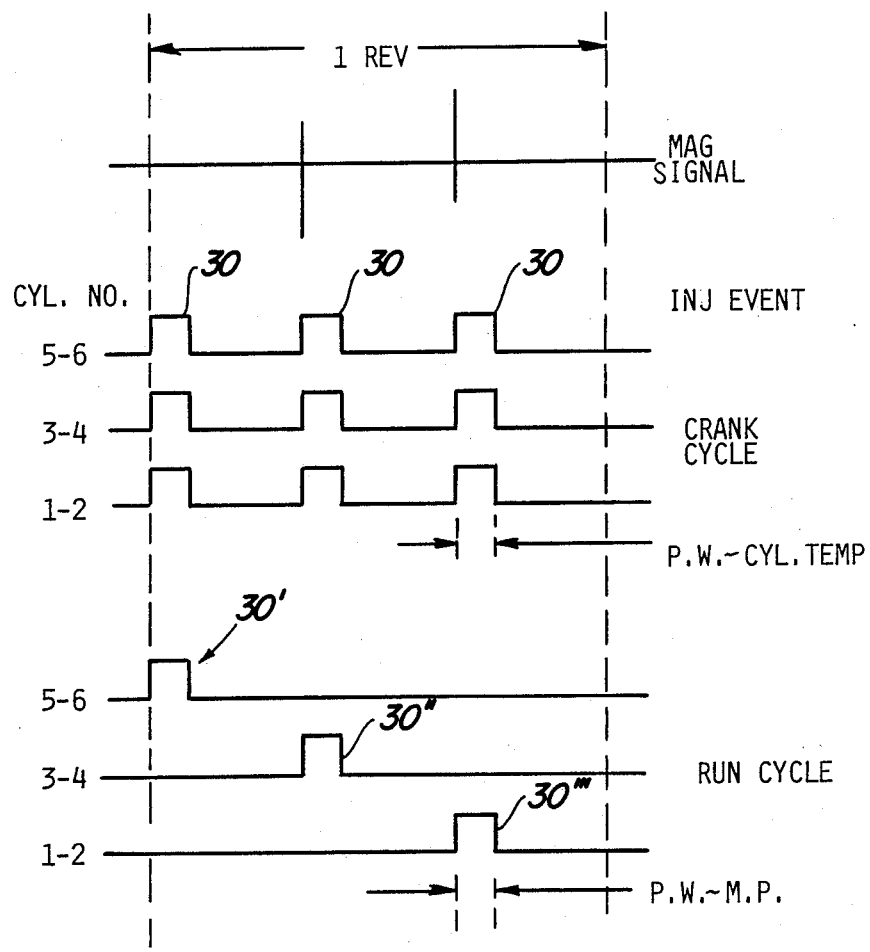
FIG. 2 is a timing diagram illustrating operation of a portion of the present invention.

With reference now particularly to FIGS. 1 and 2, the internal combustion engine 15 includes a conventional rotary output shaft 17. In addition, a magneto 19 is mechanically coupled to the engine output shaft 17 and produces three equidistantly spaced pulses 30 (FIG. 2) per revolution of the magneto 19. In the conventional fashion, the magneto 19 is rotatably driven one revolution per engine cycle, or one revolution per two revolutions of the motor shaft 17 for a four cycle engine. Furthermore, these pulses 30 are generated at predetermined angular rotational positions of the engine shaft with respect to the engine.

These pulses 30 are provided as an input signal P to the control unit 12 (FIG. 1). It will also be understood that three pulses 30 are generated per rotation of the magneto since the engine 15 shown has six engine cylinders and the engine is arranged in three pairs of cylinders wherein the engine cycle is the same for both cylinders in each cylinder pair. For fewer or more engine cylinders either more or fewer pulses 30 from the magneto will be generated since it is these pulses from the magneto which initiate engine ignition. Additionally, as is well known, the magneto is rotatably driven at one half the rotational speed of the engine output shaft for a four cycle internal combustion engine.

With reference again to FIG. 1, the rotational speed is determined from the magneto signal (primary side of ignition circuit). Similarly, a pressure transducer 23 in the intake manifold provides a signal on input 34 to the control unit 12 representative of the pressure in the intake manifold. Likewise, temperature transducers 25 and 27 in both the exhaust gas flow and at the cylinder head, respectively, provide temperature signals as inputs 36 and 38 of the control unit 12.

In the well known fashion, each fuel injector 14 includes a valve which, when opened, provides fuel to the engine. Furthermore, the control unit 12 provides output signals on its output lines 40 to the fuel injectors 14 to open these valves. Thus, when the control unit 12 provides a VALVE OPEN output signal on any of its lines 40, the valve associated with the fuel injector 14 for the particular line 40 is opened thus supplying fuel to that particular cylinder on the engine.

Operation of the internal combustion engine can occur in any one of several different modes and, in each such mode, the VALVE OPEN signal is modified thereby adapting the fuel delivery schedule for the particular engine operating condition. Each of these different engine operations will be separately discussed.

ALL RUNNING CONDITIONS

With reference now particularly to FIG. 2, during engine cruising the pulses 30 from the magneto are used to initiate a VALVE OPEN signal and thus the supply of fuel to the particular injectors 14. In particular, the first pulse 30' is used to initiate the VALVE OPEN signal to cylinders five-six, the second pulse 30'' initiates the VALVE OPEN signal to the injectors for cylinders three and four while, lastly, the third pulse 30''' per revolution initiates the VALVE OPEN signal for the remaining two cylinders one-two. This cycle, of course, is continuously repeated during the operation of the engine.

While the magneto output pulses 30 are used to initiate the VALVE OPEN signal to the fuel injectors 14, the manifold pressure on input line 34 is used to control or modify the duration or width of the VALVE OPEN signal to the fuel injectors 14. Specifically, the control unit 12 generates a VALVE OPEN signal on its output lines 40 in accordance with the following table:

|            | 40 | 12.8 | 12.9 | 13.0 | 13.1 | 13.3 | 16.6 |             |
|            | 33 | 10.5 | 10.7 | 11.0 | 11.1 | 11.4 | 11.9 |             |
| Manifold   | 27 | 7.7  | 8.0  | 8.2  | 8.4  | 8.5  | 8.6  | Milli-      |
| Pressure   |    |      |      |      |      |      |      | seconds     |
| Inches     | 20 | 4.8  | 5.0  | 5.3  | 5.3  | 5.3  | 5.5  |             |
| Mercury    |    |      |      |      |      |      |      |             |
|            | 13 | 3.2  | 3.4  | 3.6  | 3.8  | 4.0  | 4.2  |             |

-continued

|   | 0   | 0   | 0    | 0    | 0    | 0    |
|---|-----|-----|------|------|------|------|
|   | 450 | 900 | 1400 | 1800 | 2300 | 2700 |

In addition to modifying the duration of the VALVE OPEN signal proportionately with the manifold pressure signal on input line 34, the nozzles are opened with magneto signal and held open a duration of time relative to Manifold Pressure only. Furthermore, the above fuel delivery schedule to the fuel injectors 14 results in overall fuel economy and engine efficiency.

COLD ENRICHMENT (For Starting)

It has also been found that in order to obtain optimum engine performance, the fuel must be increased when the engine is relatively cold at both idle and off idle running conditions. The engine temperature is determined by the transducer 27 which provides an input on line 38 to the control unit 12. Consequently, the control unit 12 modifies the duration of the VALVE OPEN signal generated by the control unit 12 by multiplying the duration of the OPEN VALVE signal by a multiplier factor in accordance with the following table:

|                       | 160 | 1.0 | 1.0 | 1.0 | 1.0 | 1.0 |            |
|                       | 120 | 1.1 | 1.0 | 1.0 | 1.0 | 1.0 |            |
| Cylinder Head         | 80  | 1.2 | 1.1 | 1.1 | 1.0 | 1.0 | Multiplier |
| Temperature ° F.      |     |     |     |     |     |     | Factor     |
|                       | 40  | 1.5 | 1.3 | 1.2 | 1.1 | 1.0 |            |
|                       | 0   | 2.0 | 1.7 | 1.3 | 1.1 | 1.0 |            |
|                       |     | 0   | 1   | 2   | 3   | 4   |            |
|                       |     | Time Since Engine was |||||      |
|                       |     | Last Started (Minutes) |||||     |

HOT ENRICHMENT

In the well known fashion, additional fuel can be provided by the fuel injectors to the engine in order to prevent overheating of the engine. In the preferred embodiment of the invention, the maximum desired cylinder head temperature is 460° F. Hot enrichment is to provide extra fuel for cooling cylinders when needed, such as during high engine power and low aircraft speed. Thus, the control unit 12 utilizes the cylinder head temperature from sensor 27 on input line 38 to multiply the duration of the VALVE OPEN pulse to the fuel injectors 14 as a function of the cylinder head temperature in accordance with the following table:

| Cylinder Head Temperature ° F. | Multiplier |
|---|---|
| 480 | 1.4 |
| 460 | 1.3 |
| 440 | 1.2 |
| 420 | 1.1 |
| 400 | 1.0 |

ENGINE STARTING

As is well known, additional fuel is required to start the engine. Thus, during engine starting, the control unit 12 generates a VALVE OPEN signal on each of its output lines 40 during each magneto pulse or three pulses per magneto revolution. Additionally, in order to provide efficient engine starts when the engine is both hot and cold without manipulation of manual controls by the operator, the duration of the VALVE OPEN pulse is modified by the cylinder head temperature by multiplying the duration of the VALVE OPEN signal by a factor in accordance with the following table:

| Cylinder Head Temperature °F. | 160 | 1.0 | 1.0 | 1.0 | 1.0 | 1.0 | Multiplication Factor |
|---|---|---|---|---|---|---|---|
| | 120 | 1.1 | 1.0 | 1.0 | 1.0 | 1.0 | |
| | 80 | 1.2 | 1.1 | 1.1 | 1.0 | 1.0 | |
| | 40 | 1.5 | 1.3 | 1.2 | 1.1 | 1.0 | |
| | 0 | 2.0 | 1.7 | 1.3 | 1.1 | 1.0 | |
| | | 0 | 1 | 2 | 3 | 4 | |
| | | Time Since Engine was Last Started (Minutes) | | | | | |

AUTOLEAN

Figure 3:
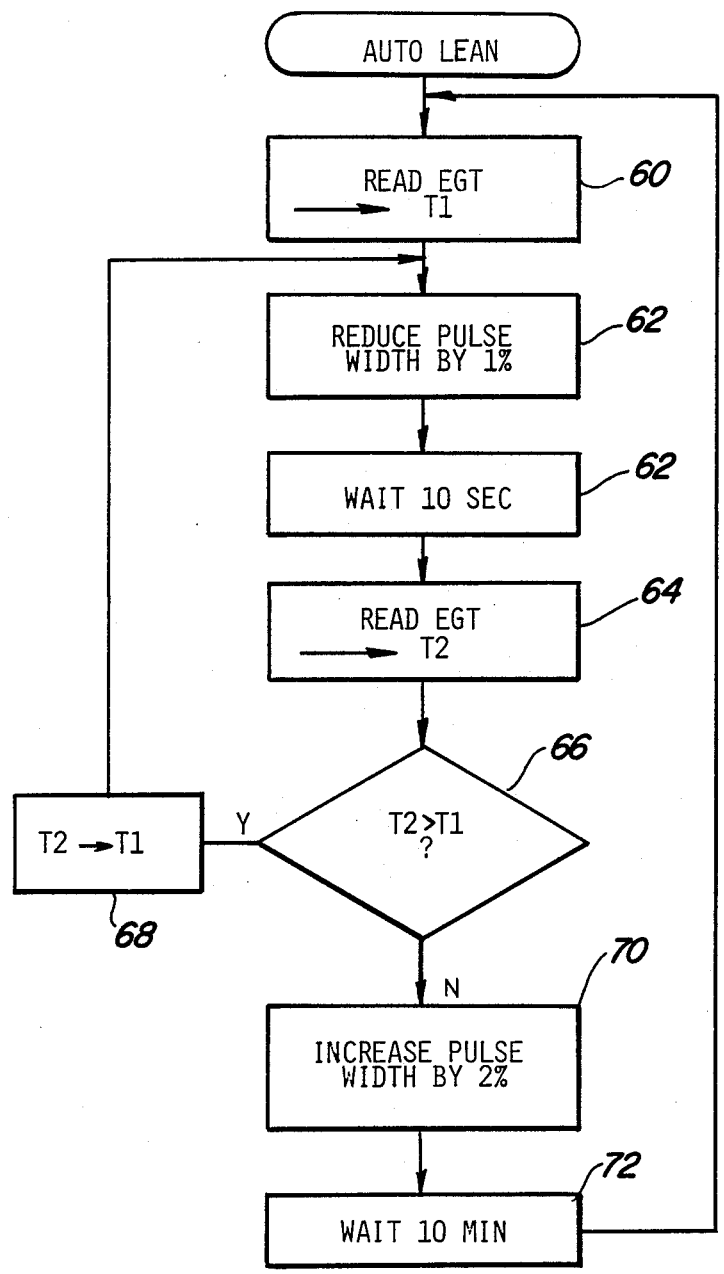
FIG. 3 is a flow chart illustrating the auto-lean fuel scheduling program for the preferred embodiment of the present invention.

During a cruise condition in order to maximize fuel economy, the fuel injection system of the present invention includes an auto-lean scheduling cycle. As best shown in FIG. 3, during the auto-lean scheduling cycle, the control unit 12 first reads the exhaust gas temperature (EGT) from the transducer 25 on input line 36 at step 60. This initial exhaust gas temperature is stored in variable T1. Step 60 then proceeds to step 62 in which the pulse duration of the VALVE OPEN signal is reduced by the control unit 12 by 1%. Step 62 then proceeds to step 64 where a ten second delay is imposed by the control unit 12.

Following the ten second delay, the control unit again reads the exhaust gas temperature (EGT) on input line 36 at step 64 and stores this new exhaust gas temperature in temperature T2. In step 66, the temperature T2, i.e. the most recent exhaust gas temperature, is compared with T1 or the initial exhaust gas temperature. In the event that T2 is greater than T1, step 66 branches to step 68 where the value of T2 is stored in the value T1 and the above process, beginning with step 62, is again repeated.

Conversely, in the event that T2 is less than T1, step 66 branches to step 70 in which the width of the VALVE OPEN signal is increased by 2%. Step 70 then proceeds to step 72 in which the control unit 12 imposes a ten minute delay on maintaining the duration of the valve open signal constant. After the ten minute delay, step 72 proceeds to step 60 wherein the above process is repeated.

CONCLUSION

In conclusion, it can be seen that the present invention provides a unique fuel injection delivery system which is simple and yet totally effective in use. Unlike other previously known fuel injection systems, the fuel injection system of the present invention utilizes the pulses from the engine magneto to initiate the opening of the fuel injectors valves while the duration of the fuel open signal is modified as a function of engine speed, manifold pressure, cylinder head temperature and, in the case of the auto-lean engine operation, the exhaust gas temperature.

Preferably, the control unit 12 is microprocessor based although hard wired logic or other means can alternatively be used.

Having described my invention, however, many modifications thereto will become apparent to those skilled in the art to which it pertains without deviation from the spirit of the invention as defined by the scope of the appended claims.

I claim:

1. A fuel injection system for an internal combustion engine of the type having an intake manifold, a rotary output shaft and at least one fuel injector, said at least one injector having a valve which, when open, enables the injection of fuel into a combustion chamber for the engine, said fuel injection system comprising:
    means located proximate to and associated with said shaft for producing at least one pulse per revolution of said shaft at a predetermined rotational position of said shaft,
    means for measuring the pressure in the manifold and for providing a pressure output signal,
    means for opening said valve in synchronism with said pulse,
    means responsive to said pressure signal for generating a VALVE OPEN signal having a duration during a cruising condition solely proportional to said pressure signal, said VALVE OPEN signal being operable to open said at least one valve during the duration of said VALVE OPEN signal,
    wherein the fuel injection is initiated at the same rotational position of the rotary output shaft and wherein the termination of the fuel injection per rotation of the shaft is varied to vary the amount of fuel injected into the engine.

2. The invention as defined in claim 1 wherein said means for producing said at least one pulse comprises means for producing a plurality of pulses per revolution of said shaft, said fuel injection system further comprising:
    means for producing a VALVE OPEN signal during each pulse when starting the engine.

3. The invention as defined in claim 2 and comprising means for generating a temperature signal representative of the cylinder head temperature of the engine during engine starting, and means for modifying the duration of said VALVE OPEN signal as a function of said temperature signal.

4. The invention as defined in claim 3 wherein said modifying means multiplies the duration of said pulses by a multiplication factor substantially as set in the following table:

| Cylinder Head Temperature ° F. | 160 | 1.0 | 1.0 | 1.0 | 1.0 | 1.0 | Multiplication Factor |
|---|---|---|---|---|---|---|---|
| | 120 | 1.1 | 1.0 | 1.0 | 1.0 | 1.0 | |
| | 80 | 1.2 | 1.1 | 1.1 | 1.0 | 1.0 | |
| | 40 | 1.5 | 1.3 | 1.2 | 1.1 | 1.0 | |
| | 0 | 2.0 | 1.7 | 1.3 | 1.1 | 1.0 | |
| | | 0 | 1 | 2 | 3 | 4 | |
| | | Time Since Engine was Last Started (Minutes) | | | | | |

5. The invention as defined in claim 1 and comprising means for generating a temperature signal representative of the cylinder head temperature and for modifying the duration of the VALVE OPEN signal as a function of said temperature signal.

6. The invention as defined in claim 5 wherein said modifying means multiplies the duration of said VALVE OPEN signal by a multiplication factor substantially as set forth in the following table:

| Cylinder Head Temperature ° F. | Multiplier |
|---|---|
| 480 | 1.4 |
| 460 | 1.3 |
| 440 | 1.2 |

| Cylinder Head Temperature ° F. | Multiplier |
|---|---|
| 420 | 1.1 |
| 400 | 1.0 |

7. The invention as defined in claim 1 and comprising:
means for generating an exhaust temperature signal representative of the exhaust gas temperature from the engine,
means for periodically reducing the duration of said VALVE OPEN signal by a preset amount until the exhaust gas temperature signal decreases, and
means for thereafter increasing the duration of the valve open signal by a second predetermined amount.

8. The invention as defined in claim 1 wherein said VALVE OPEN accordance with the following table:

| | | | | | | | | |
|---|---|---|---|---|---|---|---|---|
| | 40 | 12.8 | 12.9 | 13.0 | 13.1 | 13.3 | 16.6 | |
| | 33 | 10.5 | 10.7 | 11.0 | 11.1 | 11.4 | 11.9 | |
| Manifold Pressure | 27 | 7.7 | 8.0 | 8.2 | 8.4 | 8.5 | 8.6 | Milliseconds |
| | 20 | 4.8 | 5.0 | 5.3 | 5.3 | 5.3 | 5.5 | |
| | 13 | 3.2 | 3.4 | 3.6 | 3.8 | 4.0 | 4.2 | |
| | 10 | 0 | 0 | 0 | 0 | 0 | 0 | |
| | | 450 | 900 | 1400 | 1800 | 2300 | 2700 | |
| | | Engine RPM | | | | | | |

9. A fuel injection system for an internal combustion engine of the type having an intake manifold, a rotary output shaft, and at least one fuel injector, said at least one injector having a valve which, when open, enables the injection of fuel into a combustion chamber for the engine, said fuel injection system comprising:
a magneto located proximate said shaft for producing at least one pulse per revolution of said shaft at a predetermined rotational position of said shaft,
means for measuring the pressure in the manifold and for providing a pressure output signal,
means for opening said valve in synchronism with said pulse,
means responsive to said pressure signal for generating a valve open signal having a duration proportional to said pressure signal,
said valve open signal being operable to control the length of time said valve shall be open in response to the opening of said valve by said means for opening.

* * * * *